United States Patent [19]

Labelle

[11] 4,269,598
[45] May 26, 1981

[54] VEHICLE TRANSPORTER

[76] Inventor: Eugene C. Labelle, 19, 10eme rue, Ferme Neuve, Quebec, Canada, J0W I0C

[21] Appl. No.: 979

[22] Filed: Jan. 4, 1979

[51] Int. Cl.³ .............................................. B63H 16/12
[52] U.S. Cl. ............................................................ 440/11
[58] Field of Search .................. 115/71, 19, 20, 1 R; 180/186, 9.24, 9.26, 7 R, 9, 15, 16, 74

[56] References Cited

U.S. PATENT DOCUMENTS

| | | | |
|---|---|---|---|
| 2,342,535 | 2/1944 | Frova | 115/71 |
| 3,011,184 | 12/1961 | Curcio | 115/71 |
| 3,332,388 | 7/1967 | Moraski | 115/71 |
| 3,965,843 | 6/1976 | Smith | 115/71 |

*Primary Examiner*—Trygve M. Blix
*Assistant Examiner*—Jesús D. Sotelo

[57] ABSTRACT

An amphibious single vehicle transporter. The transporter is of the type having its power and steering provided by the vehicle being transported. The transporter, in one embodiment, has an impeller roller which projects below the transporter. This impeller roller is frictionally driven by the drive wheels of the vehicle through an intermediate drive roller to propel the transporter on land or water. In another embodiment, the transporter has at least one loading ramp which is also constructed to act as a rudder for the transporter.

18 Claims, 11 Drawing Figures

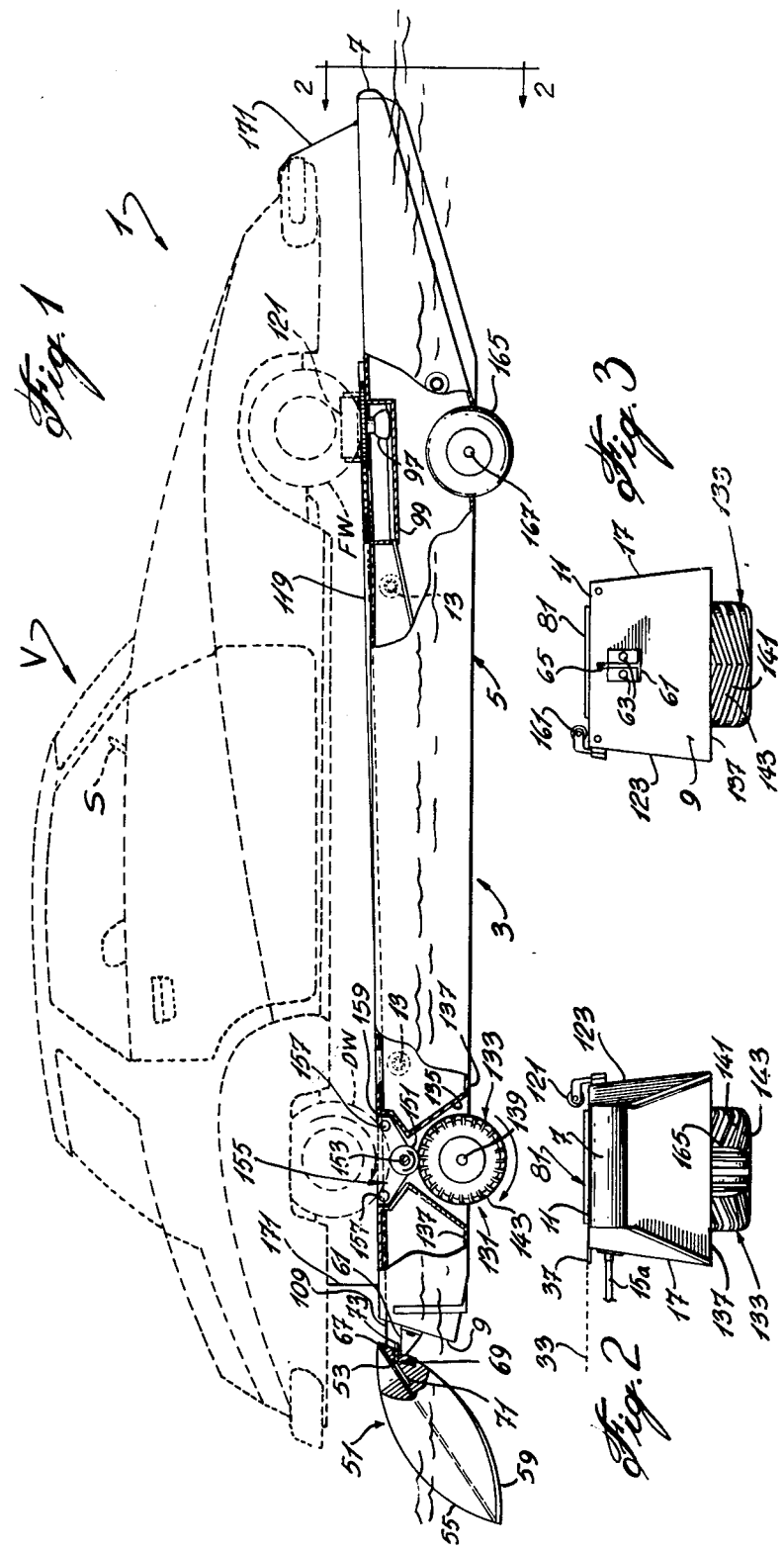

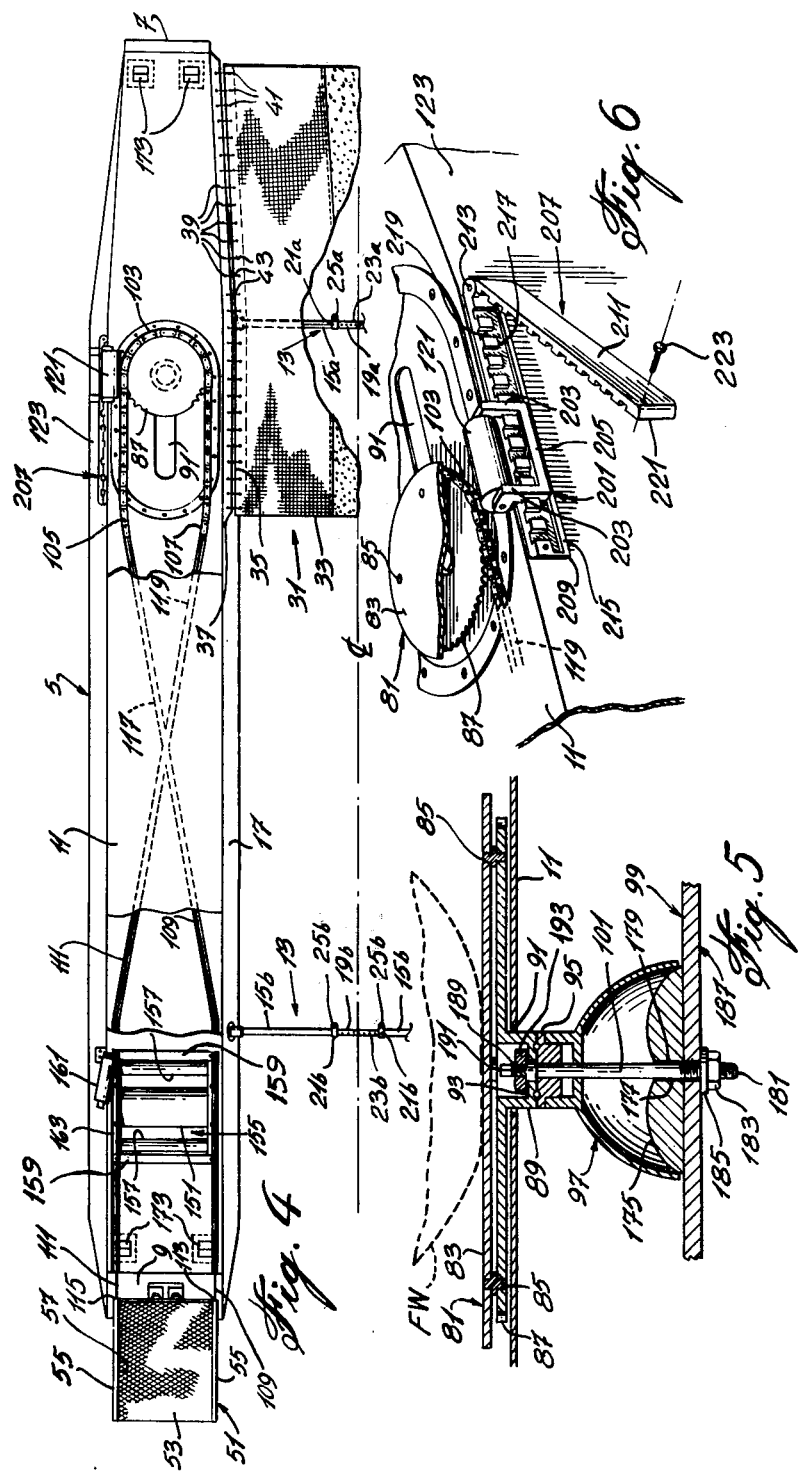

VEHICLE TRANSPORTER

BACKGROUND OF THE INVENTION

1. Field of the Invention

This invention is directed toward a vehicle transporter. The invention is more particularly directed toward an amphibious single vehicle transporter.

2. Description of the Prior Art

Single vehicle transporters for transporting a land vehicle on water, and often on land as well, are well known. These transporters generally operate using the drive means of the vehicle to be transported to drive the transporter. The transporter itself has no power means to drive it. Examples of such transporters are shown in the following U.S. Pat. Nos. 928,955; 1,419,977; 1,568,307; 2,997,012; 3,011,184; 3,646,904 and 3,965,843; and in U.K. Pat. No. 1,388,298.

Generally, the known transporters comprise a flotation platform on which a vehicle, such as a car, is loaded, propeller drive means on the platform, and means to operatively connect the drive wheels of the vehicle to the propeller so that when the vehicle is operated while on the platform, it propels the transporter in the water. In addition, the platform is provided with a steering rudder which is often operatively connected to the steered wheels of the transported vehicle to be operated thereby. U.S. Pat. No. 2,997,012, for example, shows such a steering arrangement.

The known transporters have disadvantages, however. Those employing propellers to drive the transporter require a fairly complicated drive train mechanism. This, of course, is expensive both to manufacture and maintain. Also, many of the known water transporters cannot transport a vehicle on land. Thus, vehicle loading docks must usually be provided at the water's edge to use the non-amphibious transporters. In addition, transporters employing propellers, which are to be amphibious, require separate land drive means thus adding to the transporter's expense.

Many of the known transporters also employ rather primitive water steering means making steering difficult. Those transporters that employ regular, fixed rudders for better steering can have difficulty operating as amphibious transporters since the rudders can be easily damaged by obstructions in shallow water.

Some of the known amphibious transporters also employ separate loading ramps to load and unload a vehicle. This entails additional expense, and handling and stowage problems.

SUMMARY OF THE INVENTION

It is the purpose of the present invention to provide an improved vehicle transporter which avoids, and/or minimizes, many of the above prior art disadvantages.

More particularly, it is a purpose of the present invention to provide a vehicle transporter having simplified drive means for use in propelling the transporter on land or water using the drive means of the transported vehicle.

It is another purpose to provide a vehicle transporter having simplified vehicle loading means. It is a further purpose of the present invention to provide a vehicle transporter having simple, reliable, steering means.

It is yet another purpose of the present invention to provide a vehicle transporter which can be easily adjusted to properly transport vehicles of different wheelbase width and length.

In accordance with the present invention, a vehicle transporter is provided having at least one impeller roller mounted on a flotation means. A drive roller is provided to be frictionally interposed between the impeller roller and the drive means of a vehicle on the transporter. The impeller roller projects below the flotation means to propel the transporter both on land and water, when the vehicle drive means is operated. No separate propeller, or propeller drive, is required.

Further in accordance with the present invention, there is provided a vehicle transporter having flotation means, and vehicle loading means at the rear of the flotation means for use in loading a vehicle. The loading means comprises at least one loading member which is pivotably mounted on the flotation means at least to an upright axis so that the loading member can be moved from side to side to act as a rudder, as well as a loading ramp. Thus, the one member serves two functions. The loading member is also mounted to swing up out of the way when encountering an obstruction to facilitate travel in shallow water.

The invention in one embodiment is particularly directed toward a vehicle transporter having flotation means for supporting a vehicle and at least one drive means on the flotation for use in propelling the transporter on land or water using power from the drive means of the supported vehicle. Each drive means has an impeller rotatably mounted on the flotation means and projecting below the flotation means. A drive roller is mounted on the flotation means above the impeller and in friction contact with the impeller, the drive roller adapted to be contacted by the vehicle drive means.

The invention is also particularly directed toward a vehicle transporter having flotation means for supporting a vehicle and loading means at the rear of the flotation means for use in loading a vehicle on the flotation means. Means pivotably mount the loading means to the flotation means for pivoting movement about an upright axis. Means are also provided for pivoting the loading means about the upright axis to steer the transporter when in water.

BRIEF DESCRIPTION OF THE DRAWINGS

The invention will now be described in detail having reference to the accompanying drawings, in which:

FIG. 1 is a side elevation view, partly in cross-section, of the vehicle transporter;

FIG. 2 is a front elevation view of one float;

FIG. 3 is a rear elevation view of one float with the loading platform removed;

FIG. 4 is a plan view of half of the transporter;

FIG. 5 is a detail cross-section view of part of the steering means;

FIG. 6 is a perspective detail view of part of the steering means;

DESCRIPTION OF THE PREFERRED EMBODIMENTS

Figure 7:
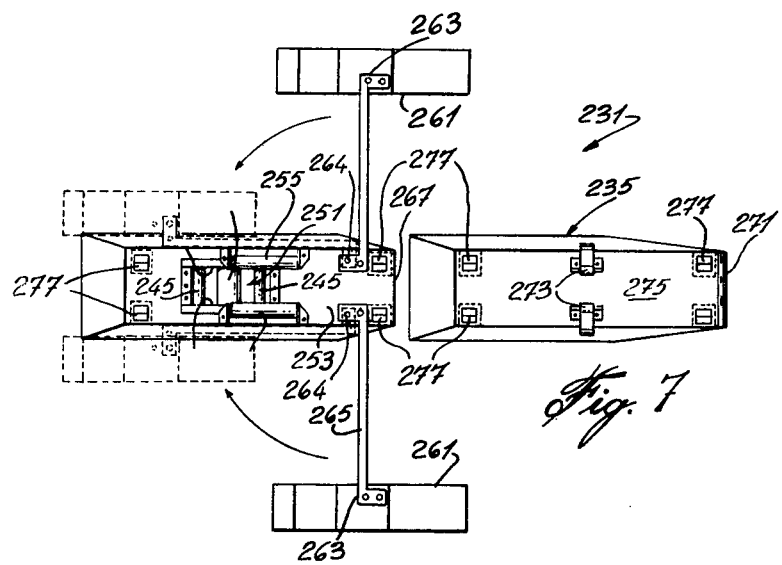
FIG. 7 is a plan view of another embodiment of the vehicle transporter.

The vehicle transporter 1 of the present invention, for transporting a vehicle "V", such as a car, has flotation means 3 for supporting the vehicle on water. The flotation means 3 preferably comprises a pair of elongated floats 5. Each float 5 has a bow end 7, which is generally streamlined for ease of passage through water, and a flat, generally upright stern end 9. The top 11 of each float is flat.

Means 13 are provided for joining the two floats 5 together in parallel, spaced-apart relation. Preferably, as shown in FIG. 4, the joining means 13 are adjustable so that the distance between the floats can be adjusted to have the transporter receive vehicles of different width. The joining means 13 can comprise a pair of tubular members 15 extending transversely from the inner side wall 17 of each float, one member 15a near the bow, the other 15b near the stern. The stern located tubular members 15b are joined together by a rod 19b, and the bow located tubular members 15a are joined together by a rod 19a, the rods 19 passing into the open ends 21 of the tubular members. The rods 19 have a series of holes 23 along their length. The rods 19 are fixed to the tubular members 15 by pins (not shown) passing through selected holes 23 in rods 19 and holes (not shown) at the ends 21 of the tubular members 15. Clamps 25 on the ends 21 of the tubular members 15 retain the pins in place locking the floats 5 together in their selected spaced-apart position.

Water deflector means 31 can be provided on the transporter near its bow end, as shown in FIG. 4 to protect a vehicle engine from being splashed by waves from underneath between the floats. The deflector means 31 comprises a flexible sheet 33 made of rubber and reinforced along the edges with a fabric. The sheet is joined along each side edge 35 of a flange 37 extending from the inner side wall 17 of each float 5 adjacent its top wall 11. Each flange 37 has a series of holes 39 along its length and each side 35 of the fabric piece 33 can have a series of grommets 41 along its length. Suitable lacing 43 joins the fabric piece 33 to the flanges 37 through the holes 39 and grommets 41. The fabric piece 33 is made wide enough to extend between the floats when at their widest position. If the floats are moved together, the fabric piece can merely hang slack between the floats.

Vehicle loading means are provided at the rear of the transporter. The loading means comprises a loading platform 51 at the stern end of each float 5 on which a vehicle can drive up to board the transporter. Each loading platform 51 has an open ramp 53 and at least one, and preferably two, upright side plates 55. The ramp 53 is rectangular in shape and is made in a rigid open pattern so that it passes water. Each side plate 55 has a generally full oval shape and is attached to one side 57 of ramp 53 along its long axis to be perpendicular to the ramp. The side plates 55 help to guide a vehicle up ramp 53 onto the floats 5, and also steer the transporter as will be described. Wear strips 59 can be attached to each side plate 55 along the bottom portion of their lower edge, if desired.

The loading platform 51 is mounted to float 5 by a mounting bracket 61 fixed centrally to the stern 9, near the top wall 11, by a pair of fasteners 63. The bracket 61 has an upright mounting pin 65. Mounted on the bottom of ramp 53, near its top edge 67 is a hinge 69. The axis of the hinge 69 is parallel to the top edge 67 of the ramp. One leaf 71 of the hinge 69 is fastened to the ramp 53. The other leaf 73 has a hole for receiving the pin 65 of bracket 61 when the platform is mounted thereon. The upper end of pin 65 can be threaded to receive a nut which holds the platform on the pin. The platform 51 moves up and down about the horizontal axis of the hinge 67, and it can also move from side to side about upright pin 65. If unsupported, the platforms 51 would hang straight down. On land, however, the platforms 51 drag behind the transporter at an angle to the stern permitting vehicle loading since they are longer than the height of the top of the floats above the ground. In the water, the platforms are maintained at an angle to the stern by connecting means used to move the platforms about their upright pins as will be described.

Means are provided on the transporter for use in moving the platforms 51 from side to side to steer the transporter. The side plates 55 of the platforms act as rudders when the platforms are moved about upright pins 65 to steer the transporter. Preferably, the platforms 51 are moved by operating the steering wheel "S" of the vehicle "V" being ferried. To this end, each float 5 is provided with a turntable 81 on the top of the float near its bow end 7. A front wheel "FW" of the vehicle is located on each turntable when the vehicle is driven onto, and positioned on, the transporter. The turntable 81 comprises a round top plate 83 detachably fastened by suitable fastening means 85 to an adjacent sprocket 87 which in turn lies adjacent the top wall 11 of the float. The sprocket 87 has a short, central sleeve 89 extending down through an opening 91 in the top wall 11. The end wall 93 of the sleeve 89 sits on a bearing 95 which in turn is mounted on a support 97. The support 97 is mounted on a support wall 99 within the float. An axle 101 extends up from support 97, centrally through end wall 93 of sleeve 89. The sprocket 87 rotates freely about axle 101 on bearing 95.

The sprocket 87 on each float 5 is operatively connected by suitable means to each platform 51 to move the platform about upright pin 65. These connecting means can include a short length of chain 103 positioned about the sprocket 87. The ends 105, 107 of the chain 103 are connected by cables 109, 111 to the upper corners 113, 115 of the platform 51, the cables crossing over, on the top wall 11 of the float in passing to the platform 51. The cables 109, 111 maintain the platforms 51 at an angle to the sterns of the floats. In passing over on the float top wall 11, the cables 109, 111 can extend through rigid guide tubes 117, 119, fixed to the top wall 11, which tubes protect the cables from damage when the front wheels of the vehicle pass over them during loading or unloading of the vehicle.

A retaining roller 121 is mounted on the float 5 at its outer wall 123 to be located adjacent the turntable 81. The retaining rollers 121 extend generally parallel to wall 123 and serve to retain the front wheels "FW" of the vehicle on the turntables 81.

Each float 5 of the transporter 1 is provided with novel drive means 131 for use in propelling the transporter. The drive means 131 are preferably operated by the drive wheels "DW" of the vehicle being transported. Each drive means 131 has an impeller 133, generally cylindrical in shape, mounted in a well 135 near the stern 9 of the float. The impeller 133 is positioned in the well 135 and projects out of the well below the bottom wall 137 of the float 5. The impeller is fixedly mounted on an axle 139 which in turn is rotatably mounted at its ends in the side walls 17, 123 of the float 5, the rotational axis of the impeller extending perpendicular to the float. The outer cylindrical surface 141 of the impeller 133 is provided with a set of shallow V-shaped, impelling vanes 143, extending across the impeller and projecting radially therefrom.

Mounted directly above the impeller 133 in the well 135 is a drive roller 151 which makes friction contact with the impeller 133 and is parallel to it. The axle 153 of the drive roller 151 is rotatably mounted in the side walls 17, 123 of the float. The driver roller 151 is centrally located with respect to an opening 155 in the top wall 11 of the float 5. A pair of guide rollers 157 are rotatably mounted between the side walls of the float 5, one guide roller 157 on each side of drive roller 151 and parallel to it. The guide rollers 157 are spaced somewhat from the drive roller 151 and are located slightly above it, adjacent the ends 159 of the top opening 155. A retaining roller 161 is mounted adjacent the outer side 163 of opening 155. The retaining roller 161 is located slightly forward of the drive roller 151 and angled slightly toward it. The retaining rollers 161 retain the drive wheels of the vehicle on the drive rollers 151.

A front wheel 165 is mounted in each float 5 near its bow end. The axle 167 of the front wheel 165 is rotatably mounted in the side walls 17, 123 of the float 5 and the wheel projects below the bottom wall 137 of the float.

In operation, the transporter 1 sits on land, near a body of water, on its front wheels 165 and on the impellers 133 which act as rear wheels for the transporter on land. The loading platforms 51 hang freely from the horizontal axis of their hinges 69 to have their bottom portions 59 rest on the ground. A vehicle "V" to be transported is driven up the ramps 53 of the sloping platforms 51 onto the top of the floats 5 and positioned thereon with its front wheels "FW" on the turntables 81 and its rear wheels "DW" resting on the guide rollers 157 to project down into the openings 155 onto the drive rollers 151. The vehicle can be tied down to the transporter in this position by suitable tie means 171 attached to anchor means 173 located on the top wall 11 of each float 5 adjacent its bow and stern ends 7, 9. The vehicle "V", while stationary on the transporter, is then operated to drive its rear wheels "DW" in a forward direction which, through drive roller 151, rotates the impellers 133 in the same direction as the rear wheels to propel the transporter over land into water. Continued operation of the vehicle wheels "DW" continues rotation of the impellers 133 to propel the transporter through the water. In the water, the platforms 51 are free to lift if any obstruction is encountered. To steer the transporter in the water, the front wheels "FW" of the vehicle are turned in the direction the transporter is to go. Turning the front wheels "FW" in one direction on the turntables 81 causes the turntables 81 to rotate about their axles 101 and, via sprockets 87 and crossed cables 109, 111, to move the platforms 51 in the opposite direction. This ramp movement turns the transporter, via the side plates 55 acting as rudders, in the desired one direction. The transporter is driven back up on the shore riding on wheels 165 and impellers 133 and the vehicle is then untied and backed off the transporter down the platforms 51.

It is desirable to have the turntables 81 adjustably mounted on the floats 5 so that they can be moved longitudinally on the top of the float toward or away from the drive rollers 151 to fit vehicles of different wheel base length. To this end, the turntable support 97 is slidably mounted on a guide member 175 fixed to the support wall 99 and extending longitudinally of the float. The axle 101 passes through longitudinal slots 177, 179 both in the guide member 175 and the support wall 99. The bottom end 181 of the axle 101 is threaded and a nut 183 and washer 185 fasten on the threaded bottom end 181 against the bottom surface 187 of the support wall 99. The upper portion 189 of the axle 101 is also threaded with the upper end 191 shaped to receive a wrench. The upper portion of the axle 101 extends into the sleeve 89 and a nut 193 is threaded onto the axle 101 within the sleeve 89. The opening 91 in the top wall 11 of the float, through which the sleeve 89 passes is also formed as a longitudinal extending slot, aligned with slots 177, 179. To adjust the position of the turntable 81, the cover plate 83 is removed from the sprocket 87 providing access to the nut 193 in the sleeve 89. The nut 193 is loosened on the axle 101 to allow the support 97, and the sprocket 87 carried by it, to move longitudinally of the float along the guide member 175 to the desired position. At this time the cables 109, 111 are disconnected from the platform 51. When the sprocket 87 has been moved to the desired position, the nut 193 is tightened, locking the support 97 in place and the cover plate 83 is fastened to the sprocket 87. The cables 109, 111 are drawn tight and refastened to the platform 51.

The front retaining roller 121 is also adjustably mounted on the outer side 123 of the float 5 so that it can be moved longitudinally to be positioned opposite the turntable. To this end, the roller 121 is rotatably mounted on a bracket 201 having a pair of vertical arms 203 joined by a horizontal arm 205. A clamp 207 extends along the side 123 of the float, adjacent the top wall 11. The clamp 207 has a first leg 209 fixed to the side wall 123, and a second leg 211 pivotally connected at one end by a pivot pin 213 to one end of the first leg 209. The outer face 215 of the first leg 209 has a longitudinal bottom groove 217 formed therein and a series of short vertical grooves 219 extending up from the bottom groove 217. The inner face 221 of the outer second leg 211 can have matching longitudinal and vertical grooves. The bracket 201 is mounted between the legs of the clamp 207 with its vertical arms 203 positioned in two of the vertical grooves 219 and its horizontal arm 205 positioned in the longitudinal groove or grooves 217. The legs 209, 211 of the clamp are closed on the bracket 201 with a screw or bolt 223 holding the legs 209, 211 together. The bracket 201 carrying the retaining roller 121 can be moved along the length of the clamp to position it opposite the turntable 81.

Figure 8:
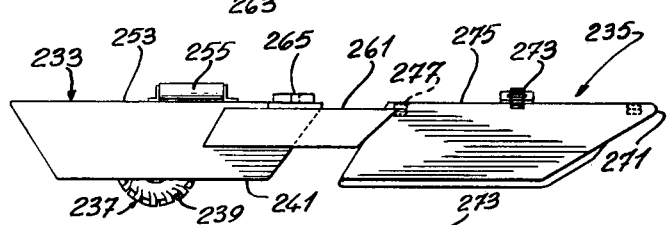
FIG. 8 is a side elevation of the transporter shown in FIG. 7.
Figure 9:
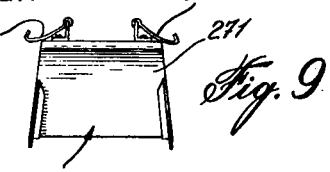
FIG. 9 is a front elevation of the transporter shown in FIG. 7.

The embodiment of the transporter described above is adapted for transporting four-wheeled vehicles such as cars or trucks. The novel drive means can also, however, be incorporated in a transporter adapted for transporting two-wheeled vehicles such as motorcycles. As shown in FIGS. 7 and 8, such a transporter 231 has flotation means in the form of a main rear float 233 and a secondary front float 235. The rear float 233 carries the drive means 237 for use in propelling the transporter 231. The drive means 237 is similar to that employed in transporter 1 and comprises a cylindrical impeller wheel 239 mounted on the rear float 233 and projecting from the bottom 241 of the float, a drive roller 243 mounted on top of, and in friction contact with, the impeller 239, and a pair of guide rollers 245, one on each side of, and slightly above, the drive roller 243.

An opening 251 in the top 253 of the rear float 233 provides access to the drive and guide rollers 243, 245. Retaining rollers 255 are mounted on the top 253 of the rear float, one on each side 257 of the opening 251.

Small pontoons 261 can be carried by the main rear float 233 on each side to provide stability. Each pontoon 261 is mounted in outrigger fashion to the end 263 of a cross arm 265, which arm extends transversely of the main float. The cross arm 265 is mounted to the top of the float, as its center, near the front end 267 of the float 233.

The front secondary float 235 is separate from the main float and has a streamlined bow end 271. A pair of clamps 273 are provided on the top 275 of the front float, one on each side of the float opposite one another for clamping the front wheel of a motorcycle thereon. The rear wheel of the motorcycle sits in the opening 251 on the main float 233 on the guide and drive rollers 243, 245. Anchor means 277 can be provided on the top corners of both floats to help in tying down the motorcycle when mounted on the floats.

The motorcycle can be manually mounted on the floats of the transporter when they are on land. Operation of mounted motorcycle will then cause rotation of the impeller 239 via drive roller 243 impelling the transporter into the water while the front float 235 skids along the ground on its bottom 279 into the water. Once in the water, the continued operation of the motorcycle will drive the transporter through the water via the impeller 239, the transporter being steered by steering the motorcycle, which through the clamped front wheel, will steer the front float 235.

Figure 10:
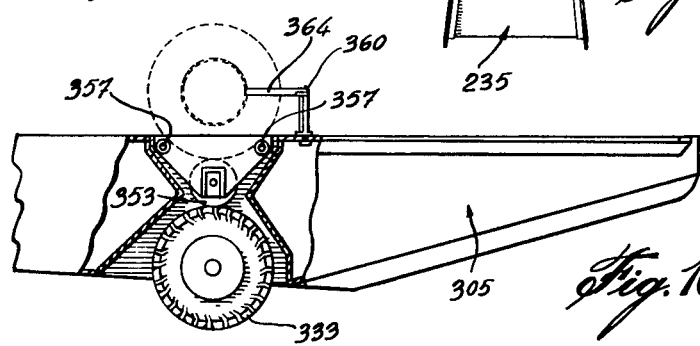
FIG. 10 is a fragmentary side elevation partly in cross-section showing another embodiment of the transporter.
Figure 11:
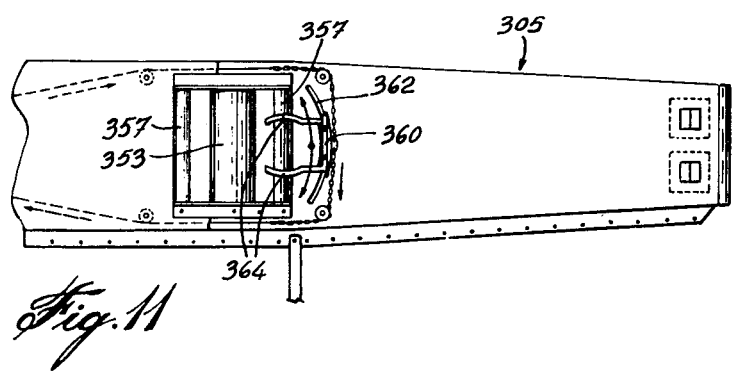
FIG. 11 is a fragmentary top plan view of the embodiment shown in FIG. 10.

The transporter shown in FIGS. 10 and 11 is essentially the same as that shown in FIGS. 1 to 6. The main difference is that the transporter including the float 305 is arranged to receive a front-wheel drive vehicle. The drive impeller 333 is located near the bow of the float 305. It is driven by roller 353 which is in direct contact with the front drive wheel DW of the vehicle shown in dotted lines. The drive wheel DW is also supported by rollers 357.

The transporter is steered by means of a holder 360 mounted on an arcuate track 362. The cables 317 are controlled by chains 307 connected to the holder 360 which moves on the track 362 in response to the drive wheel DW imprisoned between holder arms 364.

I claim:

1. A vehicle transporter having: flotation means for supporting a vehicle; the flotation means comprising at least a pair of elongated, non-rotating spaced-apart, parallel floats, and means for joining the floats together; at least one drive means on one of said floats for use in propelling the transporter on land and water using power from the drive means of the supported vehicle; said drive means on said float having an impeller rotatably mounted on the float and projecting below the float, and a drive roller mounted on the float above the impeller and in friction contact with the impeller, the drive roller adapted to be contacted by the vehicle drive means.

2. A vehicle transporter as defined in claim 1, wherein there is provided drive means on each of said float and each drive means includes an impeller journaled in the float and projecting below the float and a pair of opposed idler rollers provided on either side of the drive roller such that each drive means will receive a separate driving wheel of a vehicle being transported such that the drive wheel of the vehicle will be in frictional contact with the drive roller.

3. A vehicle transporter as claimed in claim 1, including adjustment means on the float joining means for adjustably joining the floats together in order to vary the distance they are apart.

4. A vehicle transporter as claimed in claim 1, including one drive means on each float near its stern end; a wheel rotatably mounted on each float near its bow end and projecting below the float.

5. A vehicle transporter as claimed in claim 1, including a loading platform at the stern end of each float, first mounting means for mounting the loading platform at its top edge for pivoting movement about a horizontal axis, and second mounting means for mounting the loading platform for pivoting movement about an upright axis.

6. A vehicle transporter as claimed in claim 5, wherein each loading platform has an open ramp and at least one vertical plate on one side of the ramp, the ramp directing a vehicle onto the float, the plate acting as a rudder for steering the transporter when in water.

7. A vehicle transporter as claimed in claim 6, including means on each float operable by the steering means of the transported vehicle for pivoting the loading platform about the upright mounting axis to steer the transporter when in water.

8. A vehicle transporter as claimed in claim 7, wherein the pivoting means has a turntable mounted on the top of the float near the bow end of the float, and drive means connected between the loading platform and the turntable for pivoting the loading platform about the upright mounting axis when the turntable is turned by turning a vehicle wheel positioned on the turntable.

9. A vehicle transporter as claimed in claim 8, including means for mounting the turntable on the float so it can be moved toward or away from the loading platform.

10. A vehicle transporter as claimed in claim 9, including a retaining roller on the outside of each float adjacent the turntable, and means for adjustably mounting the retaining roller on the float to maintain it adjacent the turntable when the turntable is moved.

11. A vehicle transporter as claimed in claim 1, wherein the flotation means comprises in addition to at least a pair of floats, a separate front float, the drive means mounted on one of the pair of floats for receiving the rear wheel of a two-wheeled vehicle, and means on the front float for receiving the front wheel of the vehicle.

12. A vehicle transporter as claimed in claim 1, wherein the drive means includes a pair of guide rollers cooperating with the drive roller to locate the vehicle drive means on the drive roller.

13. A vehicle transporter having: flotation means for supporting a vehicle; loading means at the rear of the flotation means for use in loading a vehicle on the flotation means; means for pivotably mounting the loading means to the flotation means for pivoting movement about an upright axis and means for pivoting the loading means about the upright axis to steer the transporter when in water.

14. A vehicle transporter as claimed in claim 13, including means for pivotably mounting the loading means for pivoting movement about a horizontal axis.

15. A vehicle transporter as claimed in claim 13, wherein the flotation means comprises two elongated, spaced-apart parallel floats and means for joining the floats together.

16. A vehicle transporter as claimed in claim 15, wherein the loading means comprises a loading platform at the stern end of each float, each loading platform comprising an open ramp and at least one vertical plate on one side of the ramp.

17. A vehicle transporter as claimed in claim 16, wherein the pivoting means includes a turntable on the top of each float near its bow end, and means operatively connecting the turntable to the loading platform to pivot the platform when a vehicle wheel, positioned on the turntable, is turned.

18. A vehicle transporter as claimed in claim 17, including means for mounting the turntable on the float so its position can be adjusted.

* * * * *